(12) United States Patent
Kim et al.

(10) Patent No.: US 9,442,303 B2
(45) Date of Patent: Sep. 13, 2016

(54) POLARIZED ULTRAVIOLET LIGHT SPLITTING ELEMENT

(71) Applicant: LG Chem, Ltd., Seoul (KR)

(72) Inventors: Tae Su Kim, Daejeon (KR); Jae Jin Kim, Daejeon (KR); Jong Byung Lee, Daejeon (KR); Jeong Ho Park, Daejeon (KR); Jin Mi Jung, Daejeon (KR); Bu Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/424,915

(22) PCT Filed: Aug. 29, 2013

(86) PCT No.: PCT/KR2013/007792
§ 371 (c)(1),
(2) Date: Feb. 27, 2015

(87) PCT Pub. No.: WO2014/035170
PCT Pub. Date: Mar. 6, 2014

(65) Prior Publication Data
US 2015/0219918 A1    Aug. 6, 2015

(30) Foreign Application Priority Data
Aug. 29, 2012   (KR) .................. 10-2012-0095098
Aug. 29, 2013   (KR) .................. 10-2013-0103320

(51) Int. Cl.
*G02B 27/28* (2006.01)
*G01J 4/00* (2006.01)
(Continued)

(52) U.S. Cl.
CPC ............... *G02B 27/283* (2013.01); *G02B 5/20* (2013.01); *G02B 5/30* (2013.01); *G02B 5/3058* (2013.01); *G02B 5/3075* (2013.01); *G21K 1/16* (2013.01); *G21K 5/04* (2013.01); *G02F 1/133788* (2013.01)

(58) Field of Classification Search
CPC   G02B 27/283; G02B 5/3058; G02B 5/3075; G01J 4/00
See application file for complete search history.

(56) References Cited

U.S. PATENT DOCUMENTS 5,453,859 A * 9/1995 Sannohe ............. G02B 27/283
                                                    349/9
5,541,057 A * 7/1996 Bogart ................ G01N 21/211
                                                    356/369
(Continued)

FOREIGN PATENT DOCUMENTS

EP    1102093 A1    5/2001
EP    1217424 A1    6/2002
(Continued)

OTHER PUBLICATIONS

Machine translation of applicant's cited reference JP 09-061627 A from https://www4.j-platpat.inpit.go.jp, dated Mar. 14, 2016.*
(Continued)

*Primary Examiner* — Frank Font
(74) *Attorney, Agent, or Firm* — Dentons US LLP

(57) ABSTRACT

The present application relates to a polarized ultraviolet light splitting element and to the use thereof. The present application may provide a polarized ultraviolet light splitting element which exhibits excellent splitting efficiency within a wide range of the ultraviolet light region and which has excellent durability. The element can be used, for example, in a photoalignment process of a liquid crystal alignment film.

14 Claims, 3 Drawing Sheets

(51) Int. Cl.
*G02B 5/30* (2006.01)
*G02B 5/20* (2006.01)
*G21K 1/16* (2006.01)
*G21K 5/04* (2006.01)
*G02F 1/1337* (2006.01)

(56) References Cited

U.S. PATENT DOCUMENTS

| | | | | |
|---|---|---|---|---|
| 5,579,138 | A * | 11/1996 | Sannohe | G02B 27/283 348/E9.027 |
| 7,605,883 | B2 * | 10/2009 | Yamaki | G02B 5/3058 349/96 |
| 7,894,019 | B2 * | 2/2011 | Yamaki | G02B 5/3058 349/96 |
| 2003/0025997 | A1 * | 2/2003 | Kawazu | G02B 5/3025 359/485.05 |
| 2003/0118269 | A1 * | 6/2003 | Wimperis | G01J 3/26 385/14 |
| 2005/0225695 | A1 | 10/2005 | Arai et al. | |
| 2006/0018018 | A1 * | 1/2006 | Nomura | B82Y 20/00 359/487.02 |
| 2007/0087549 | A1 * | 4/2007 | Yamaki | G02B 5/3058 438/613 |
| 2007/0242187 | A1 * | 10/2007 | Yamaki | G02B 5/3058 349/96 |
| 2008/0055521 | A1 | 3/2008 | Mizutani et al. | |
| 2008/0055723 | A1 | 3/2008 | Gardner et al. | |
| 2008/0137188 | A1 * | 6/2008 | Sato | G02B 5/3058 359/485.05 |
| 2008/0303986 | A1 * | 12/2008 | Yamaki | G02B 5/3058 349/96 |
| 2011/0256385 | A1 * | 10/2011 | Matsuzaki | C03C 17/42 428/336 |

FOREIGN PATENT DOCUMENTS

| | | |
|---|---|---|
| JP | 09-061627 A | 3/1997 |
| JP | 2001-147320 A | 5/2001 |
| JP | 2009-265290 A | 11/2009 |
| JP | 2011-081384 A | 4/2011 |
| KR | 10-2002-0035587 A | 5/2002 |
| KR | 10-2008-0101833 A | 11/2008 |
| KR | 10-2009-0071328 A | 7/2009 |
| KR | 10-2012-0072201 A | 7/2012 |
| WO | 2009/002791 A1 | 12/2008 |

OTHER PUBLICATIONS

Martin, N., et al., "Synthesis of TiOx and CrOy coatings prepared at high temperature," Journal of Materials Science, 2000, vol. 35, pp. 3583-3591.

* cited by examiner

POLARIZED ULTRAVIOLET LIGHT SPLITTING ELEMENT

This application is a 35 USC §371 National Stage entry of International Application No. PCT/KR2013/007792, filed on Aug. 29, 2013, which claims priority of Korean Application Nos. 10-2013-0103320 filed Aug. 29, 2013 and 10-2012-0095098 filed Aug. 29, 2012, all of which are hereby incorporated by reference in their entirety.

TECHNICAL FIELD

The present invention relates to a polarized ultraviolet light splitting element and an application thereof.

BACKGROUND ART

Liquid crystal alignment layers used in aligning liquid crystal molecules in a certain direction are being applied to various fields. As the liquid crystal alignment layer, a photo alignment layer has a surface treated by radiating light so that adjacent liquid crystal molecules are aligned. Generally, the photo alignment layer may be fabricated by irradiating a photosensitive material layer with light, for example, linearly polarized light to align the photosensitive material in a certain direction.

In order to irradiate the photo alignment layer with a linearly polarized light, various types of polarized ultraviolet light splitting elements may be used.

For example, a polarized ultraviolet light splitting element using aluminum is disclosed in the following Patent Literature 1.

CITATION LITERATURE

Patent Literature (Patent Literature 1) Korean Patent Publication No. 2002-0035587

DISCLOSURE

Technical Problem

An object of the present invention is to provide a polarized ultraviolet light splitting element and an application thereof.

Technical Solution

Exemplary embodiments of the present invention relate to a polarized ultraviolet light splitting element. Throughout the specification, the term "polarized ultraviolet light splitting element" may refer to all kinds of elements configured to extract polarized ultraviolet light among light incident to the element. Here, the polarized light may be linearly polarized light, circularly polarized light, or elliptically polarized light. In some exemplary embodiments, the polarized light may be linearly polarized light. The term "ultraviolet light" used in the present specification, for example, may refer to an electromagnetic wave in a wavelength range of about 250 to 350 nm, about 270 to 330 nm, or about 290 to 310 nm.

A polarized ultraviolet light splitting element according to an exemplary embodiment of the present invention may include a substrate layer and a convex portion formed on the substrate layer. The convex portion may include a titanium metal composite oxide. The convex portion may have a stripe shape, and at least two convex portions may be formed on the substrate layer. The stripe-shaped convex portions may be disposed substantially in parallel on the substrate layer. The number of the stripe-shaped convex portions on the substrate layer is not particularly limited and may be selected by considering, for example, an intensity of ultraviolet light to be split. Generally, the convex portions may exist by about 5 to 20 line/µm on the substrate layer.

The polarized ultraviolet light splitting element may have excellent light splitting efficiency with respect to light in a wide wavelength range, for example, ultraviolet light in a wide wavelength range. The light splitting efficiency of the polarized ultraviolet light splitting element may be defined by a polarization extinction ratio. The term "polarization extinction ratio" used in the present specification may refer to a ratio of an intensity of polarized light having a vector perpendicular to the convex portion to an intensity of polarized light having a vector parallel to the convex portion among light passing through the polarized ultraviolet light splitting element. That is, the polarized ultraviolet light splitting element may show light splitting characteristics by transmitting the light having a vector perpendicular to the convex portion (so called P polarized light) and reflecting the light having a vector parallel to the convex portion (so called S polarized light). The light splitting efficiency may be defined by ratio of P polarized light to S polarized light.

For example, R calculated by the following Equation 1 may be two or more, 15 or more, 20 or more, 25 or more, 30 or more, 35 or more, 40 or more, or 45 or more in the polarized ultraviolet light splitting element. The upper limit of R calculated by Equation 1 is not particularly limited. That is, the greater R indicates the greater light splitting efficiency. In respect of practicality, R may be, for example, 2,000 or less, 1,500 or less, 1,000 or less, 900 or less, 800 or less, 700 or less, 600 or less, 500 or less, 400 or less, 300 or less, 200 or less, or 150 or less.

$$R = Tc/Tp \qquad \text{[Equation 1]}$$

In Equation 1, Tc represents a transmission rate of light polarized in a perpendicular direction to the stripe-shaped convex portion and having a wavelength of about 250 to 350 nm with respect to the polarized ultraviolet light splitting element, and Tp represents a transmission rate of light polarized in a parallel direction to the stripe-shaped convex portion and having a wavelength of about 250 to 350 nm with respect to the polarized ultraviolet light splitting element. In other embodiments, the wavelength of light applied to Equation 1 may be about 270 to 330 nm, or about 290 to 310 nm.

In addition, the polarized ultraviolet light splitting element may show an excellent transmission rate. The term "transmission rate" may refer to an intensity of light transmitted through the polarized ultraviolet light splitting element and having a vector perpendicular to the convex portion (P polarized light) among light radiated to the polarized ultraviolet light splitting element, for example, ultraviolet light.

For example, P calculated by the following Equation 2 may be 0.2 to 0.5 in the polarized ultraviolet light splitting element.

$$P = Tc/T \qquad \text{[Equation 2]}$$

In Equation 2, T represents an intensity of light radiated to the polarized ultraviolet light splitting element and having a wavelength of about 250 to 350 nm, and Tc represents an intensity of light transmitted through the polarized ultraviolet light splitting element among the radiated light, polarized in a perpendicular direction to the stripe-shaped convex portion, and having a wavelength of about 250 to 350 nm. In other embodiments, the wavelength of light applied to Equation 2 may be about 270 to 330 nm, or about 290 to 310 nm.

FIG. 1 schematically shows a cross-section of a polarized ultraviolet light splitting element according to an exemplary embodiment of the present invention, and FIG. 2 schematically shows a top view of a polarized ultraviolet light splitting element according to an exemplary embodiment of the present invention. As shown in FIGS. 1 and 2, the polarized ultraviolet light splitting element may include a substrate layer 1 and a concavo-convex pattern 2 formed on the substrate layer 1.

Convex portions 2a configuring the concavo-convex pattern 2 may be arranged in parallel in a stripe shape as shown in FIG. 2. In this case, between the convex portions 2a, a concave portion 2b may be formed by the convex portions 2a. The pitch, width, and height of the convex portion 2a may be adjusted to satisfy a splitting performance with respect to ultraviolet light, for example, the polarization extinction ratio and the transmission rate. In the present specification, the term "pitch P" refers to a length obtained by adding a width W of the convex portion 2a to a width of the concave portion 2b (see FIG. 2), and the term "height" refers to a height H of the convex portion 2a (see FIG. 1). When the heights H of the convex portions 2a are different from one another, the height is a height of the highest convex portion, or an average height of the convex portions 2a.

In the polarized ultraviolet light splitting element, the convex portion 2a may include a titanium metal composite oxide. The composite oxide may include, for example, a doped titanium oxide. The composite oxide may have a transmission rate of less than 10%, less than 5%, less than 3%, less than 2%, less than 1%, less than 0.2%, or less than 0.1% at a wavelength of 350 nm, and the lower limit may be, but not particularly limited thereto, about 0.01% or 0.001%. In some embodiments, the transmission rate may be obtained by measuring the polarized ultraviolet light splitting element having a thickness of 100 nm using a conventional transmission rate measuring apparatus. When the composite oxide is configured to have the above-described transmission rate, the light splitting efficiency may be ensured in a wider ultraviolet wavelength range than when the existing titanium oxide or aluminum is used. The type or amount of a metal included in the composite oxide may be selected in such a manner that the composite oxide has the above-described transmission rate and, as long as selected in this way, may not be particularly limited. For example, the titanium metal composite oxide may include titanium, and one or more second metals selected from Ni, Cr, Cu, Fe, B, V, Nb, Sb, Sn, Si, and Al. In other embodiments, the second metal may be Ni or Cr.

In addition, the ratio of the second metal in the composite oxide may be selected by considering the above-described transmission rate, for example, 1 to 20 mol %, 2 to 18 mol %, or 3 to 15 mol %.

In other embodiments, the composite oxide may be represented by the following Chemical Formula.

   [Chemical Formula 1]

In Chemical Formula 1, M is one or more metals selected from the group consisting of Ni, Cr, Cu, Fe, B, V, Nb, Sb, Sn, Si, or Al, y is 0.01 to 0.2, and (x+y) is 1. In other embodiments, M may be Ni or Cr. In still other embodiments, y may be 0.05 to 0.15, or 0.07 to 1.13.

The pitch P of the convex portion, that is, the stripe-shaped convex portion arranged substantially in parallel may be, for example, 50 to 200 nm, 100 to 180 nm, 110 to 150 nm, 120 to 150 nm, 130 to 150 nm, or 140 to 150 nm. When the pitch P is over 200 nm, a proper light splitting efficiency may not be ensured.

In some embodiments, a dielectric material may exist in the concave portion 2b formed by the convex portion 2a. According to an exemplary embodiment of the present invention, a refractive index of the dielectric material with respect to light having a wavelength range of 250 to 350 nm may be one to five. The dielectric material may not be particularly limited, as long as it has the above-described range of refractive index. For example, the dielectric material may be silicon oxide, magnesium fluoride, silicon nitride, or air. In some embodiments, when the dielectric material is air, the concave portion 2b of the concavo-convex pattern 2 may be substantially an empty space.

In some embodiments, the ultraviolet light polarized ultraviolet light splitting element may have a in the range of 0.74 to 10 and b in the range of 0.5 to 10, which are calculated by the following Equation 3.

$$(a+bi)^2 = n_1^2 \times (1-W/P) + n_2^2 \times W/P$$ [Equation 3]

In Equation 3, i is an imaginary number unit, $n_1$ is a refractive index of the dielectric material with respect to ultraviolet light having a wavelength within the wavelength range of 250 to 350 nm, for example, 300 nm wavelength, $n_2$ is a refractive index of the convex portion 2a with respect to ultraviolet light having a wavelength within the wavelength range of 250 to 350 nm, for example, 300 nm wavelength, W is a width of the convex portion 2a, and P is a pitch of the convex portion 2a.

When the pitch P is configured to satisfy the above-described Equation 3, a polarized ultraviolet light splitting element having a high degree of polarization of 0.5 or more, 0.6 or more, 0.7 or more, or 0.9 or more in a short wavelength range, for example, in a light wavelength range of 250 to 350 nm may be obtained even in a pitch range of 120 nm or more. The upper limit of the polarized light may be, but not particularly limited thereto, 0.98 or less, 0.95 or less, or 0.93 or less in respect of the economic efficiency of a fabrication process. That is, when the degree of polarization is more than 0.98, an aspect ratio (width/height of the convex portion 2a) of the convex portion 2a of the polarized ultraviolet light splitting element may be increased. Accordingly, the polarized ultraviolet light splitting element may be difficult to be fabricated, and the manufacturing process may be complicated. In the present specification, the term "degree of polarization" may refer to an intensity of polarized light with respect to an intensity of the incident light, and the degree of polarization may be calculated as the following Equation 4.

$$\text{Degree of Polarization } D = (Tc-Tp)/(Tc+Tp)$$ [Equation 4]

In Equation 4, Tc represents a transmission rate of light polarized in a perpendicular direction to the convex portion 2a and having a wavelength of about 250 to 350 nm with respect to the polarized ultraviolet light splitting element, and Tp represents a transmission rate of light polarized in a parallel direction to the convex portion 2a and having a wavelength of about 250 to 350 nm with respect to the polarized ultraviolet light splitting element. Here, the term "parallel" refers to "substantially parallel," and the term "perpendicular" refers to "substantially perpendicular."

Further, in some embodiments, c may be 1.3 to 10 and d may be 0.013 to 0.1 in the ultraviolet light polarized ultraviolet light splitting element, which are calculated by the following Equation 5.

$$(c+di)^2 = n_1^2 \times n_2^2 / ((1-W/P) \times n_2^2 + W \times n_1^2/P) \quad \text{[Equation 5]}$$

In Equation 5, i is an imaginary number unit, $n_1$ is a refractive index of the dielectric material with respect to ultraviolet light having a wavelength within the wavelength range of 250 to 350 nm, for example, a 300 nm wavelength, $n_2$ is a refractive index of the convex portion 2a with respect to ultraviolet light having a wavelength within the wavelength range of 250 to 350 nm, for example, a 300 nm wavelength, W is a width of the convex portion 2a, and P is a pitch of the convex portion 2a.

When the pitch P and the width W satisfy Equation 3 and/or Equation 5, an appropriate transmission rate having excellent polarized light splitting characteristics may be obtained.

The height H of the convex portion 2a may be, but not particularly limited thereto, for example, 20 to 300 nm, 50 to 200 nm, 100 to 150 nm, 150 to 250 nm, or 200 or 280 nm. When the height H of the convex portion exceeds 300 nm, the absolute amount of light may be lowered since the amount of absorbed light increases. Accordingly, when the height H of the convex portion is within the above-described, a proper polarized ultraviolet light splitting element may be fabricated since the amount of absorbed light is not so much. Accordingly, the polarized ultraviolet light splitting element may have a good polarized light splitting performance while maintaining an excellent ultraviolet light transmission rate. In addition, degradation in the ease of fabricating a pattern due to an increase of the aspect ratio caused by an increase of the height H of the convex portion 2a under the same pitch P may be prevented.

The width W of the convex portion 2a may be, but not limited thereto, for example, 10 to 160 nm. In particular, when the pitch P of the convex portion 2a is 50 to 150 nm, the width W of the convex portion 2a may be 10 to 120 nm, 30 to 100 nm, or 50 to 80 nm, A fill-factor of the convex portion may be 0.2 to 0.8, for example, 0.3 to 0.6, 0.4 to 0.7, 0.5 to 0.75, or 0.45. When the fill-factor of the convex portion is within the above-described range, the polarized ultraviolet light splitting element may show a good polarized light splitting performance, and degradation in polarization characteristics of the polarized ultraviolet light splitting element may be prevented since the amount of absorbed light is not so much. The term "fill-factor of the convex portion" used in the present specification refers to a ratio of the width W of the convex portion to the pitch P of the convex portion.

In the polarized ultraviolet light splitting element according to an exemplary embodiment of the present invention, a may be 0.74 to 10 and b may be 0.5 to 10, which are calculated by the following Equation 6, and c may be 1.3 to 10 and d may be 0.013 to 0.1, which are calculated by the following Equation 7.

$$(a+bi)^2 = n1^2 \times (1-W/P) + n_2^2 \times W/P \quad \text{[Equation 6]}$$

$$(c+di)^2 = n_1^2 \times n_2^2 / ((1-W/P) \times n_2^2 + W \times n_1^2/P) \quad \text{[Equation 7]}$$

In Equation 6 and Equation 7, i is an imaginary number unit, and $n_1$ is a refractive index of the dielectric material with respect to ultraviolet light having a wavelength within the wavelength range of 250 to 350 nm, for example, 300 nm wavelength, $n_2$ is a refractive index of the convex portion 2a with respect to ultraviolet light having a wavelength within the wavelength range of 250 to 350 nm, for example, 300 nm wavelength, W is a width of the convex portion 2a, and P is a pitch of the convex portion 2a. When the polarized ultraviolet light splitting element is designed in such a way that a, b, c, and d are within the above-described ranges by Equation 6 and Equation 7, an excellent degree of polarization and extinction ratio may be implemented even in a short wavelength range.

The type of the substrate layer included in the polarized ultraviolet light splitting element may be, but not limited thereto, for example, quartz, ultraviolet light transmitting glass, polyvinyl alcohol (PVA), poly carbonate, ethylene vinyl acetate (EVA) copolymer, etc. The ultraviolet light transmission rate of the substrate layer 1 may be, for example, 70% or more, 80% or more, or 90% or more. When the transmission rate is within the above-described range, the ultraviolet light transmission rate of the polarized ultraviolet light splitting element may be improved, and a photo alignment layer having an excellent photo alignment speed may be fabricated.

The polarized ultraviolet light splitting element may be, for example, fabricated using a well-known method of forming a wire grid. For example, the polarized ultraviolet light splitting element may be fabricated by forming the composite oxide layer on the substrate layer and selectively removing the composite oxide layer to be patterned. In this case, the composite oxide layer may be, for example, formed by a normal co-deposition method, or a well-known method, such as a sol-gel method, a solid-phase method, a hydrothermal method, a sputtering method, or a chemical vapor deposition (CVD) method. Further, the composite oxide layer initially patterned by another well-known pattern forming method, for example, a deposition method using a mask, may be formed on the substrate layer.

For example, the polarized ultraviolet light splitting element may be fabricated by forming a titanium metal composite oxide layer on the substrate layer and patterning the titanium metal composite oxide layer.

In some embodiments, the composite oxide layer may be formed on a substrate layer including an anti-reflection layer formed on a surface thereof. The anti-reflection layer may function to prevent degradation of efficiency due to an internal reflection or indirect reflection of a laser while a grid is formed on the metal composite oxide layer, for example, by laser interference lithography and form a finer grid. A material and a manufacturing method of the anti-reflection layer may not be limited as long as it is formed to absorb an internally reflected laser.

A method of patterning the metal composite oxide layer formed on the substrate layer may be, but not limited thereto, for example, well-known photolithography, or laser interference lithography, e-bean lithography, nano imprint lithography (NIL), immersion lithography, or a sol-gel method in order to form a pattern having a finer pitch.

NIL is a method of forming a pattern having a predetermined line width. The method may include forming a resist layer on a metal layer, then engraving a stamp patterned in a preferred line width at constant temperature and pressure with respect to the substrate layer on which the resist layer is formed on an imprint resist film, and then removing the remaining metal layer using plasma. Such a method may be particularly appropriate for forming of a fine pattern.

According to another exemplary embodiment of the present invention, an apparatus including the polarized ultraviolet light splitting element, for example, a light illuminating apparatus is provided. The light illuminating apparatus according to the exemplary embodiment of the present invention may include the polarized ultraviolet light splitting element and a subject mounting device.

The polarized ultraviolet light splitting element may function as a polarization plate. For example, the polarized ultraviolet light splitting element may be used to generate a linearly polarized light from a light radiated from a light source.

The light illuminating apparatus may further include a photo alignment mask between the subject mounting device and the polarized ultraviolet light splitting element.

The photo alignment mask may be, for example, installed to be spaced apart from a surface of the subject mounted on the subject mounting device by about 50 mm or less. The distance may be, for example, more than 0 mm, 0.001 mm or more, 0.01 mm or more, 0.1 mm or more, or 1 mm or more. In addition, the distance may be 40 mm or less, 30 mm or less, 20 mm or less, or 10 mm or less. The distance between the surface of the subject and the photo alignment mask may be designed in various combinations between the upper limit and the lower limit.

The subject mounting device may not be particularly limited, and all types of equipment designed for the subject to be stably maintained while light is radiated may be included.

In addition, the light illuminating apparatus may further include a light source capable of irradiating the photo alignment mask or the polarized ultraviolet light splitting element with light, for example, ultraviolet light. As the light source, any one capable of radiating light toward the photo alignment mask or the polarized ultraviolet light splitting element may be used with no particular limitation. For example, a high pressure mercury ultraviolet light lamp, a metal halide lamp, or a gallium ultraviolet light lamp and the like, which radiate ultraviolet light, may be used as the light source.

The light source may include one or more light illuminating means. When the light source includes a plurality of light illuminating means, the number or arrangement of the light illuminating means are not particularly limited. When the light source includes a plurality of light illuminating means, the light illuminating means may form two or more rows, and a light illuminating means disposed at one row among the two or more rows and another light illuminating means disposed at another row adjacent to the one row may be arranged to alternately overlap one another.

The expression "the light illuminating means alternately overlap one another" may means that a line connecting a center of a light illuminating means disposed at one row to a center of another light illuminating means disposed at another row adjacent to the one row is formed in a direction that is not parallel to a direction perpendicular to each row (that is, in a direction sloped at a predetermined angle), and illumination areas of the light illuminating means partially overlap in a direction perpendicular to each row.

FIG. 3 shows the above-described arrangement of the light illuminating means according to an exemplary embodiment of the present invention. In FIG. 3, a plurality of light illuminating means 10 are arranged in two rows, that is, in an A row and a B row. Among the light illuminating means shown in FIG. 3, assuming that a light illuminating means represented by a reference numeral 101 is a first light illuminating means, and a light illuminating means represented by a reference numeral 102 is a second light illuminating means, a line P connecting centers of the first and second light illuminating means may not be parallel to a line C formed in a direction perpendicular to the A and B rows. In addition, an illumination area of the first light illuminating means and an illumination area of the second light illuminating means may be overlapped to an extent Q in a direction perpendicular to the A and B rows.

According to the arrangement shown FIG. 3, the amount of light radiated by the light source may be uniformly maintained. The degree of overlapping of one light illuminating means and another light illuminating means, for example, Q in FIG. 3 is not particularly limited. For example, the degree of overlapping may be about ⅓ to ⅔ of a diameter of the light illuminating means, for example, about ⅓ to ⅔ of a diameter of L in FIG. 3.

The light illuminating apparatus may further include one or more light collecting plates configured to control the amount of light radiated from the light source. The light collecting plate may be included in the light illuminating apparatus so that light radiated from the light source is incident to and collected in the light collecting plate and then the collected light is radiated to the polarized ultraviolet light splitting element and the photo alignment mask. As the light collecting plate, a well-known configuration formed to collect light radiated from the light source may be used. As the light collecting plate, a lenticular lens layer may be used.

FIG. 4 is a view showing a light illuminating apparatus according to an exemplary embodiment of the present invention. The light illuminating apparatus shown in FIG. 4 may include a light source 10, a light collecting plate 20, a polarized light plate 30, a mask 40, and a subject mounting device 60 for mounting a subject 50, which are sequentially arranged. In the light illuminating apparatus shown in FIG. 4, light radiated from the light source 10 is incident to the light collecting plate 20 first, collected, and then is incident to the polarized light plate 30. Light incident to the polarized light plate 30 is converted to a linearly polarized light, becomes re-incident to the mask 40, and is guided by an opening to be radiated on a surface of the subject 50.

According to an exemplary embodiment of the present invention, a method of radiating light is provided. The method of radiating light according to the exemplary embodiment of the present invention may be performed using the above-described light illuminating apparatus. For example, the method of radiating light may include mounting a subject on the subject mounting device, and irradiating the subject with light by the medium of the polarized ultraviolet light splitting element and the mask.

In some embodiments, the subject may be a photo alignment layer. In this case, the method of radiating light may be a method of preparing an aligned photo alignment layer. For example, the aligned photo alignment layer may be fabricated by irradiating a photo alignment layer fixed on the subject mounting device with linearly polarized light, etc., by the medium of the polarized ultraviolet light splitting element and the mask, to align a photosensitive material included in the photo alignment layer in a predetermined direction.

The type of the photo alignment layer applicable to the method of radiating light may not be particularly limited. Various types of photo alignment compounds having a photosensitive moiety and applicable for forming the photo alignment layer are well-known in the art, and those well-known photo alignment compounds may be used to form the photo alignment layer. The photo alignment compound may be, for example, a compound aligned by trans-cis photo-isomerization, a compound aligned by photolysis such as chain scission or photo-oxidation, a compound aligned by photo-crosslinking or photo-polymerization such as [2+2] cycloaddition, [4+4] cycloaddition, or photo-dimerization, a compound aligned by photo-Fries rearrangement, or a compound aligned by a ring opening/closure reaction. The compound aligned by trans-cis photo-isomerization may be, for example, an azo compound, such as a sulfonated diazo dye or an azo polymer, or stilbenes, and the compound aligned by photolysis may be, for example, cyclobutane-1, 2,3,4-tetracarboxylic dianhydride, aromatic polysilane or polyester, a polystyrene or polyimide, etc. In addition, the compound aligned by photo-crosslinking or photo-polymerization may be a cinnamate compound, a coumarin compound, a cinnamamide compound, a tetrahydrophthalimide compound, a maleimide compound, a benzophenone compound, a diphenylacetylene compound, a compound having a chalconyl moiety as a photosensitive moiety (hereinafter, a chalcone compound) or a compound having an anthracenyl moiety (hereinafter, an anthracenyl compound), etc., and the compound aligned by photo-Fries rearrangement may be an aromatic compound, such as a benzoate compound, a benzoamide compound, and a methacrylamidoaryl methacrylate compound. The compound aligned by a ring opening/closure reaction may be a [4+2] π-electronic system such as spiropyran compound, but is not limited thereto. The photo alignment layer may be formed by a well-known method in which the photo alignment compound is used. For example, the photo alignment layer may be formed of the compound on a proper supporting substrate and applied to the method of radiating light while being transferred by a subject mounting device such as a roll.

In the method, the photo alignment layer irradiated with light by the medium of the polarized ultraviolet light splitting element and the mask, may be a first-aligned photo alignment layer. For example, the first alignment may be achieved by irradiating the entire surface of the photo alignment layer with ultraviolet light linearly polarized in one direction by the polarized ultraviolet light splitting element before irradiating the photo alignment layer with light by the medium of the mask. When light polarized in a direction different from the direction of the first alignment is radiated on the first-aligned photo alignment layer, the light is radiated only on an area of the photo alignment layer corresponding to the opening, and the photo alignment compound is rearranged. Thereby, a photo alignment layer in which the alignment direction of the photo alignment compound is patterned may be fabricated.

When the linearly polarized ultraviolet light is radiated at least one time in order to align the photo alignment layer, the orientation of the photo alignment layer may be determined by the polarization direction of light radiated at the end. Accordingly, when the photo alignment layer is first-aligned in such a manner that ultraviolet light linearly polarized in one direction by the polarized ultraviolet light splitting element is radiated on the photo alignment layer, and then the first-aligned photo alignment layer is exposed to light linearly polarized in a direction different from the direction of the first alignment by the medium of the mask, the orientation of the photo alignment layer may be changed to a direction different from the direction of the first alignment only in a predetermined area on which the light is radiated. Accordingly, a pattern including at least a first alignment area having a first alignment orientation and a second alignment area having a second alignment orientation different from the first alignment orientation, or at least two types of alignment areas having different alignment orientations may be formed on the photo alignment layer.

In some embodiments, a polarization axis of the linearly polarized ultraviolet light during the first alignment may be perpendicular to a polarization axis of the linearly polarized ultraviolet light during a second alignment performed by the medium of the mask after the first alignment. The term "perpendicular" may refer to "substantially perpendicular". In this way, the photo alignment layer fabricated by controlling polarization axes of light radiated during the first and second alignments may be, for example, used in an optical filter implementing three dimensional images.

For example, an optical filter may be fabricated by forming a liquid crystal layer on the above-described photo alignment layer. The method of preparing the liquid crystal layer may be, for example, but not limited thereto, formed by coating and aligning the photo alignment layer with a liquid crystal compound capable of being crosslinked or polymerized by light, and radiating light on the liquid crystal compound to be cross-linked or polymerized. Through the process, the liquid crystal compound layer is aligned and fixed along the orientation of the photo alignment layer, and a liquid crystal film including at least two areas having different alignment directions may be fabricated.

The type of liquid crystal compound coated on the photo alignment layer is not particularly limited, and may be properly selected depending on the application of the optical filter. For example, if the optical filter is a filter for implementing three-dimensional images, the liquid crystal compound may be aligned according to an alignment pattern of an alignment layer disposed therebelow and form a liquid crystal polymer layer having a $\lambda/4$ phase difference by photo-crosslinking or photo-polymerization. The term "$\lambda/4$ phase difference" may refer to a property by which an incident light is delayed by ¼ of a wavelength of the incident light. When such a liquid crystal compound is used, an optical filter separates an incident light into a counterclockwise polarized light and clockwise polarized light Methods of depositing the liquid crystal compound, aligning the liquid crystal compound according to the alignment pattern of an alignment layer disposed therebelow, and crosslinking or polymerizing the aligned liquid crystal compound may not be particularly limited. For example, the alignment may be executed by maintaining a liquid crystal layer at a proper temperature at which the liquid crystal compound has liquid crystallinity according to the type of the liquid crystal compound. The crosslinking or polymerization may be executed by irradiating a liquid crystal layer with light at a level at which a proper crosslinking or polymerizing is induced according to the type of the liquid crystal compound.

Advantageous Effects

According to an exemplary embodiment of the present invention, a polarized ultraviolet light splitting element having an excellent splitting efficiency in a wide range of ultraviolet light and excellent durability can be provided.

DESCRIPTION OF SYMBOLS

Figure 1:
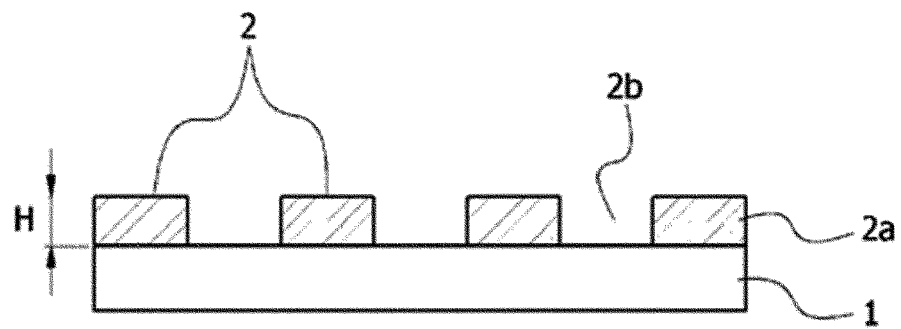
FIG. 1 schematically shows a cross-sectional view of a polarized ultraviolet splitting element according to an exemplary embodiment of the present invention.
Figure 2:
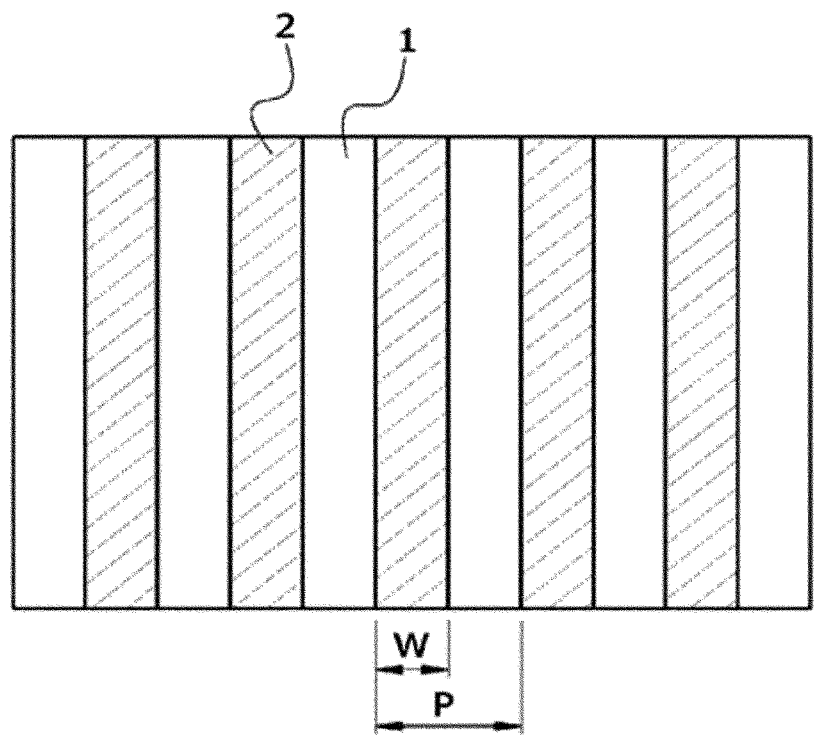
FIG. 2 schematically shows a top view of a polarized ultraviolet light splitting element according to an exemplary embodiment of the present invention.
Figure 3:
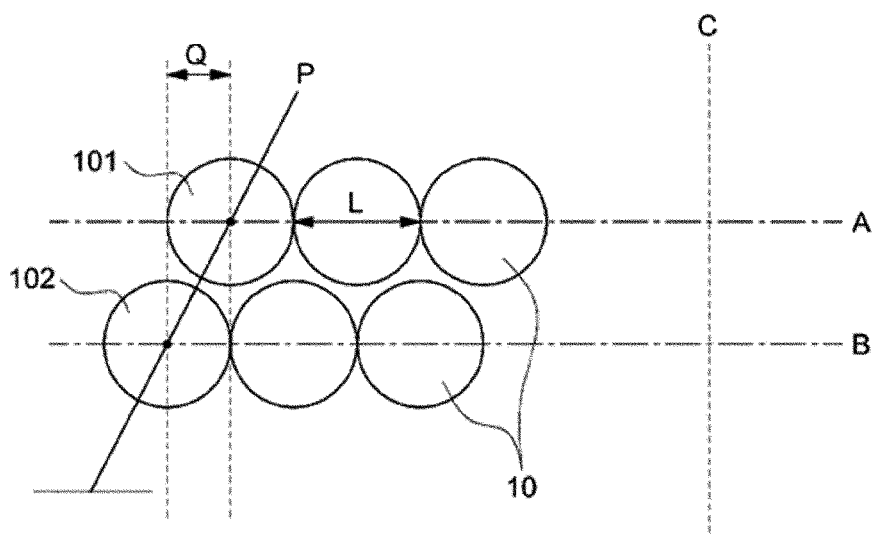
FIG. 3 shows an arrangement of a light illuminating means according to an exemplary embodiment of the present invention.
Figure 4:
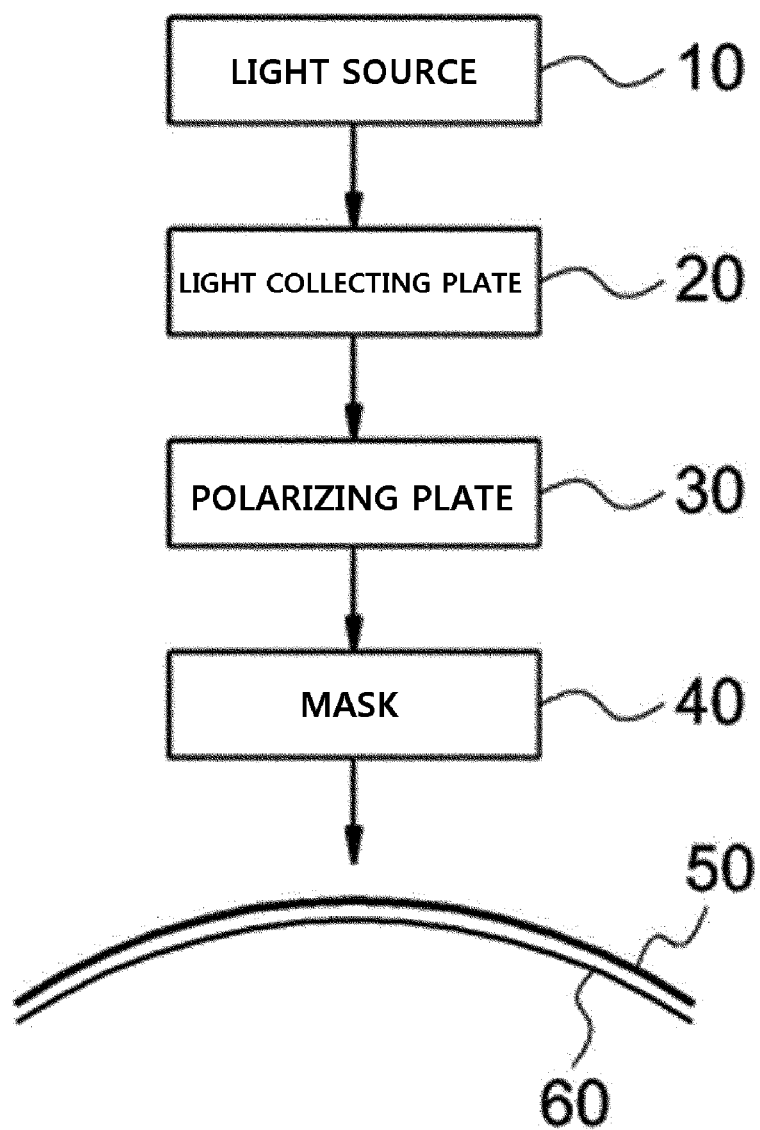
FIG. 4 shows a light illuminating apparatus according to an exemplary embodiment of the present invention.

1: substrate layer
2: light absorbing layer
2a: convex portion
2b: concave portion
10, 101, 102: light illuminating means
20: light collecting plate
30: polarized ultraviolet light splitting element
40: mask
50: subject
60: subject mounting device

MODES FOR CARRYING OUT THE INVENTION

Hereinafter, the present invention will be described in more detail through Examples according to the present invention and Comparative Examples not according to the present invention. However, the scope of the present invention will not be limited by the following Examples.

Example 1

A quartz glass layer was ultrasonically cleaned in acetone and isopropyl alcohol (IPA) for 20 minutes to remove dust on a surface thereof. Next, Ti and Ni were co-deposited on the quartz glass layer in an oxygen atmosphere using e-beam evaporation to form a metal composite oxide layer, which is represented by the following Chemical Formula 2, having a thickness of about 100 nm. Next, the deposited layer was spin-coated with mr-8010r (manufactured by Micro Resist Technology GmbH) to have a thickness of 100 nm, and baked at the temperature of 95° C. for one minute. Next, an imprint process was performed using an imprinting master. In the imprint process, the temperature of a press is about 160° C. The metal composite oxide layer is maintained at 40 bar for 3 minutes, then cooled for two minutes, and then demolded at a temperature of 100° C. Next the metal composite oxide layer is dry-etched using an ICP RIE apparatus. Next, a resist used the imprint process is removed using acetone as an organic solvent, to fabricate a polarized ultraviolet light splitting element including a convex portion having a width W of about 70 nm and a pitch P of about 150 nm.

$Ti_xNi_yO_2$ [Chemical Formula 3]

In Chemical Formula 3, x is 0.9, and y is 0.1.

Example 2

A polarized ultraviolet light splitting element was fabricated using the same method as in Example 1. However, the polarized ultraviolet light splitting element includes a convex portion of a metal composite oxide layer, which is formed by co-depositing Ti and Ni and represented by the following Chemical Formula 4. In addition, the polarized ultraviolet light splitting element has a height of about 100 nm, a width of about 70 nm, and a pitch of about 150 nm.

$Ti_xCr_yO_2$ [Chemical Formula 4]

In Chemical Formula 4, x is 0.9, and y is 0.1.

Comparative Example 1

A polarized ultraviolet light splitting element including a pattern formed by a $TiO_2$ convex portion was fabricated using the same method as in Example 1.

1. Evaluation of R by Equation 1

The polarization extinction ratio R of each of the Example and Comparative Examples, which is calculated by Equation 1, was evaluated by stacking a polarization plate having 0.99 polarization degree in a wavelength range of 250 nm to 350 nm on a fabricated sample and then measuring a transmission rate of the sample using a transmission measurement apparatus. The results are listed in the following Table 1.

TABLE 1

| | R (Tc/Tp) in each wavelength band | | | | |
|---|---|---|---|---|---|
| | 250 nm | 275 nm | 300 nm | 325 nm | 350 nm |
| Example 1 | 32.69 | 37.11 | 50.33 | 24.96 | 10.08 |
| Example 2 | 58.84 | 61.85 | 31.46 | 13.75 | 8.56 |
| Comparative Example 1 | 10.21 | 29.30 | 47.53 | 17.33 | 1.80 |

2. Evaluation of Transmission Rate

A transmission rate was evaluated with respect to a specimen formed of a material of each of Example and Comparative Examples and having a thickness of 100 nm, using a well-known transmission rate measuring apparatus. The results are listed in the following Table 2.

TABLE 2

| | Transmission rate(%) in each wavelength band | | | | |
|---|---|---|---|---|---|
| | 250 nm | 275 nm | 300 nm | 325 nm | 350 nm |
| Example 1 ($Ti_xNi_yO_2$) | 0.010 | 0.011 | 0.11 | 0.028 | 0.081 |
| Example 2 ($Ti_xCr_yO_2$) | 0.005 | 0.006 | 0.017 | 0.052 | 0.095 |

The invention claimed is:

1. A polarized ultraviolet light splitting element, comprising:
a substrate layer; and
at least two stripe-shaped convex portions formed on the substrate layer comprising a titanium metal composite oxide, and wherein the at least two stripe-shaped convex portions are geometrically parallel to each other, wherein the titanium metal composite oxide is represented by the following Chemical Formula 1:

$Ti_xM_yO_2$ [Chemical Formula 1]

wherein M is Ni, Cr, Cu, Fe, B, V, Nb, Sb, Sn, Si, or Al, y is 0.01 to 0.2, and x+y is 1.

2. The polarized ultraviolet light splitting element of claim 1, wherein a polarization extinction ratio R calculated by the following Equation 1 is about 2 or more:

$R = Tc/Tp$, [Equation 1]

wherein Tc represents a transmission rate of light polarized in a perpendicular direction to the stripe-shaped convex portion and having a wavelength of about 250 to 350 nm with respect to the polarized ultraviolet light splitting element when light radiates through the polarized ultraviolet light splitting element, and Tp represents a transmission rate of light polarized in a parallel direction to the stripe-shaped convex portion and having a wavelength of about 250 to 350 nm with respect to the polarized ultraviolet light splitting element when light radiates through the polarized ultraviolet light splitting element.

3. The polarized ultraviolet light splitting element of claim 1, wherein a light transmission rate P calculated by the following Equation 2 is about 0.2 to 0.5:

$$P = Tc/T,$$ [Equation 2]

wherein T represents an intensity of light radiated to the polarized ultraviolet light splitting element and having a wavelength of about 250 to 350 nm when light radiates through the polarized ultraviolet light splitting element, and Tc represents an intensity of light, which passes through the polarized ultraviolet light splitting element, among the radiated light, polarized in a perpendicular direction to the stripe-shaped convex portion, and having a wavelength of about 250 to 350 nm when light radiates through the polarized ultraviolet light splitting element.

4. The polarized ultraviolet light splitting element of claim 1, wherein the titanium metal composite oxide has a light transmission rate of less than 10% at a wavelength of 350 nm.

5. The polarized ultraviolet light splitting element of claim 1, wherein the titanium metal composite oxide is an oxide comprising titanium and at least one second metal selected from Ni, Cr, Cu, Fe, B, V, Nb, Sb, Sn, Si, and Al.

6. The polarized ultraviolet light splitting element of claim 5, wherein a ratio of the second metal in the titanium metal composite oxide is one to 20 mol %.

7. The polarized ultraviolet light splitting element of claim 1, wherein a pitch of the stripe-shaped convex portion formed in parallel is 50 nm to 200 nm.

8. The polarized ultraviolet light splitting element of claim 7, wherein a ratio W/P of a width W of the convex portion with respect to the pitch P of convex portion is 0.2 to 0.8.

9. The polarized ultraviolet light splitting element of claim 1, wherein a height of the convex portion is 20 to 300 nm.

10. A light illuminating apparatus, comprising:
a mounting device; and
the polarized ultraviolet light splitting element of claim 1, which are sequentially arranged.

11. The light irradiation apparatus of claim 10, further comprising an alignment mask located between the mounting device and the polarized ultraviolet light splitting element.

12. An arrangement comprising:
an ultraviolet light source; and
the light irradiation apparatus of claim 10;
wherein the light source irradiates the polarized ultraviolet light splitting element with ultraviolet light.

13. A method of irradiating a subject with light, comprising:
mounting a subject on the mounting device of the light illuminating apparatus of claim 10; and
irradiating the subject by the medium of the polarized ultraviolet light splitting element.

14. A method of preparing an aligned photo alignment layer, comprising:
mounting a photo alignment layer on the mounting device of the light illuminating apparatus of claim 10; and
irradiating the photo alignment layer with a linearly polarized light by the medium of the polarized ultraviolet light splitting element.

* * * * *